United States Patent
Lamb et al.

(10) Patent No.: US 11,032,599 B2
(45) Date of Patent: *Jun. 8, 2021

(54) SYSTEMS, METHODS AND APPARATUS FOR INTERACTING WITH A SECURITY SYSTEM USING A TELEVISION REMOTE CONTROL

(71) Applicant: ECOLINK INTELLIGENT TECHNOLOGY, INC., Carlsbad, CA (US)

(72) Inventors: Michael Lamb, Rancho Santa Fe, CA (US); Jeremy Black, N. Tustin, CA (US); Thomas Thibault, Carlsbad, CA (US)

(73) Assignee: ECOLINK INTELLIGENT TECHNOLOGY, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,523

(22) Filed: Jun. 17, 2019

(65) Prior Publication Data
US 2019/0306558 A1    Oct. 3, 2019

Related U.S. Application Data

(63) Continuation of application No. 15/140,766, filed on Apr. 28, 2016, now Pat. No. 10,362,350.

(51) Int. Cl.
| | |
|---|---|
| H04N 21/422 | (2011.01) |
| H04L 12/28 | (2006.01) |
| G08B 25/00 | (2006.01) |
| G08B 25/14 | (2006.01) |
| G06K 9/00 | (2006.01) |
| H04N 21/41 | (2011.01) |
| H04N 21/478 | (2011.01) |

(Continued)

(52) U.S. Cl.
CPC ......... *H04N 21/42204* (2013.01); *G06K 9/00* (2013.01); *G06K 9/00771* (2013.01);
(Continued)

(58) Field of Classification Search
CPC ............ G06K 9/00771; H04L 12/2823; H04L 12/2854; H04N 21/238; H04N 21/42204;
(Continued)

(56) References Cited

U.S. PATENT DOCUMENTS

| | | | | |
|---|---|---|---|---|
| 9,060,152 | B2* | 6/2015 | Sirpal | G06F 3/04842 |
| 9,258,593 | B1* | 2/2016 | Chen | H04N 21/4223 |

(Continued)

OTHER PUBLICATIONS

ISA/US, International Search Report and Written Opinion issued on PCT application No. US2017/24059, dated Jun. 15, 2017, 10 pages.

(Continued)

*Primary Examiner* — Md N Haque
(74) *Attorney, Agent, or Firm* — Greenberg Traurig, LLP

(57) ABSTRACT

A method and apparatus is described for interacting with a security system using a television remote control. Commands sent by the remote control are received by an auxiliary interface device, which then provides the commands to a security system controller either directly, via a local-area network, or via a wide-area network and server. Status and acknowledgement messages are transmitted from the security system controller to the auxiliary device, whereupon they are provided to and displayed by a television in the form of a security dashboard.

20 Claims, 8 Drawing Sheets

(51) Int. Cl.
*H04N 7/18* (2006.01)
*H04N 21/238* (2011.01)
*H04N 21/431* (2011.01)
*H04N 21/436* (2011.01)
*H04N 21/45* (2011.01)

(52) U.S. Cl.
CPC ........... *G08B 25/008* (2013.01); *G08B 25/14* (2013.01); *H04L 12/2823* (2013.01); *H04L 12/2825* (2013.01); *H04L 12/2854* (2013.01); *H04N 7/18* (2013.01); *H04N 21/238* (2013.01); *H04N 21/4131* (2013.01); *H04N 21/4312* (2013.01); *H04N 21/43615* (2013.01); *H04N 21/4532* (2013.01); *H04N 21/478* (2013.01)

(58) Field of Classification Search
CPC ......... H04N 21/4312; H04N 21/43615; H04N 21/4532; H04N 7/18
See application file for complete search history.

(56) References Cited

U.S. PATENT DOCUMENTS

| | | |
|---|---|---|
| 2002/0130763 A1 | 9/2002 | Aslanidis et al. |
| 2002/0171624 A1 | 11/2002 | Stecyk et al. |
| 2004/0068753 A1* | 4/2004 | Robertson .......... H04N 21/4104 725/126 |
| 2006/0195553 A1 | 8/2006 | Nakamura |
| 2007/0019958 A1* | 1/2007 | Calhoon ............ H04B 10/1149 398/106 |
| 2009/0213278 A1* | 8/2009 | Tsurumoto ............. H04N 5/775 348/734 |
| 2010/0309010 A1* | 12/2010 | Dang ............... H04N 21/42201 340/686.6 |
| 2012/0077468 A1* | 3/2012 | Fan .................... G07C 9/00309 455/414.1 |
| 2015/0162006 A1* | 6/2015 | Kummer .......... H04N 21/47217 704/275 |
| 2015/0333965 A1* | 11/2015 | Lee ..................... H04L 12/4625 370/254 |
| 2016/0203700 A1* | 7/2016 | Bruhn .................. H04R 1/1041 340/506 |

OTHER PUBLICATIONS

European Patent Office, supplementary European search report issued on European patent application No. 17790058.6, dated Aug. 27, 2019, 7 pages.

European Patent Office, Examination Report issued on European patent application No. 17790058.6, dated Oct. 2, 2020, 3 pages.

* cited by examiner

SYSTEMS, METHODS AND APPARATUS FOR INTERACTING WITH A SECURITY SYSTEM USING A TELEVISION REMOTE CONTROL

CROSS-REFERENCE TO RELATED APPLICATIONS

This application is a continuation of U.S. patent application Ser. No. 15/140,766, filed on Apr. 28, 2016.

BACKGROUND

Field of Use

The present application relates to the field of security systems. More specifically, the present application relates to interaction with a home security system using devices other than what normally controls such security systems.

Description of the Related Art

Security systems for homes and businesses have been around for many years. Typically, these systems comprise an on-site, central controller in communication with one or more door/window sensors, motion detectors, sound detectors, light detectors, etc., to detect unauthorized entry. If an unauthorized entry is detected, the central controller may cause an alarm to be sounded locally and/or a remote monitoring station may be contacted that can send police to the location. The central controller is also typically in communication with an on-site keypad/display device that allows information to be sent to the central controller, such as arm/disarm commands, while also displaying information provided by the central controller, such as system status and/or individual sensor information. In addition to the keypad/display device, the central controller may be at least partially controlled by a wireless key fob carried by a user to wirelessly arm and disarm the system, as well as to have auxiliary functions performed, such as turning on a light or to close one or more garage doors.

While the key fob is a convenient way to control basic operations of a home security system, the key fob may not always be near a user inside the home. For example, the key fob may not be within reach of a homeowner when the homeowner is watching TV. However, the homeowner generally will be in possession of a TV remote control that allows convenient, wireless operation of a TV. Most TV remote controls generate infra-red (IR) signals that are incompatible with home security systems and are therefore incapable of interacting with such home security systems.

It would be desirable, then, for people to interact their home security systems using an existing consumer control device, such as a TV remote control.

SUMMARY

The embodiments described herein relate to a system, method and apparatus for interacting with a security system using a television remote control. In one embodiment, a method is described, comprising receiving a signal from the television remote control, the signal comprising a command to cause the security system to perform one or more actions, accessing a server associated with the security system via a wide-area network, the server for providing an interface to the security system, and providing the electronic signal to the server via the wide-area network, wherein the server forwards the electronic signal to the security system to perform the one or more actions associated with the command.

In another embodiment, an apparatus is described, comprising a receiver for receiving signals from the television remote control, an output, a memory for storing processor-executable instructions, and a processor, coupled to the receiver, the output, and the memory, for executing the processor-executable instructions that cause the apparatus to receive a command from the television remote control, the command to cause the security system to perform one or more actions, access a server associated with the security system via a wide-area network, the server for providing an interface to the security system, and provide the command to the server via the output and the wide-area network, wherein the server forwards the command to the security system for the security system to perform the one or more actions associated with the command.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present disclosure relates to embodiments of a system, method and apparatus for interacting with a security system using a remote control device that is incompatible with the security system directly, for example, an infra-red (IR) remote control. Features of such embodiments include allowing an individual to operate a security system using a TV remote, obtain security system status information and display the status visually on a television, have the TV remote monitor use of the TV remote and perform one or more pre-programmed actions upon detection of one or more events, and control other functionality offered by a number of other devices and/or systems in a home or business setting.

Figure 1:
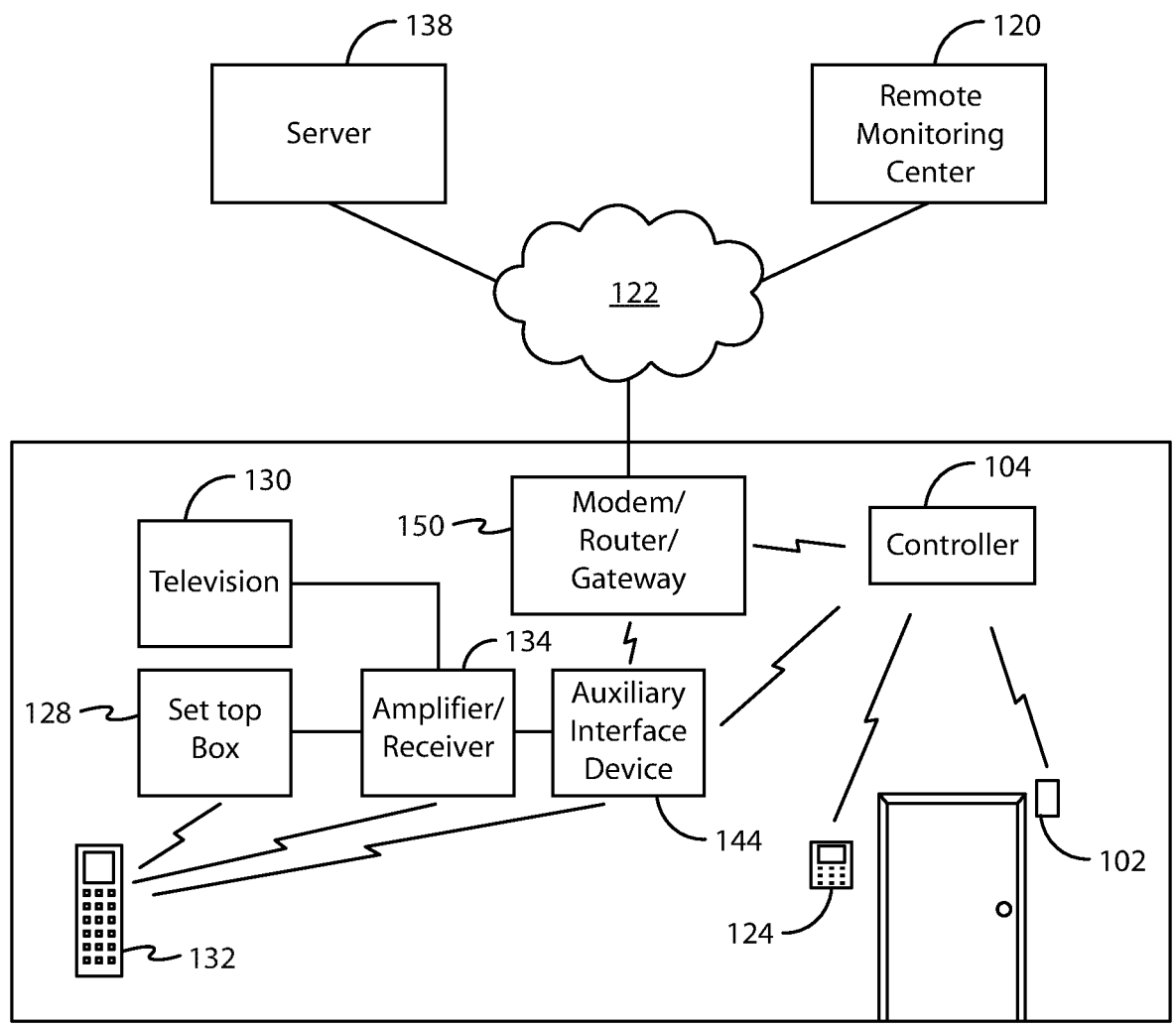
FIG. 1 is an illustration of one embodiment of a security system in a structure such as a home or business, comprising a sensor and a security system controller.

FIG. 1 is an illustration of one embodiment of a security system 100 in a structure 101, such as a home or business, comprising sensor 102, and a security system controller 104. Sensor 102 comprises, in this embodiment, a magnetic door sensor comprising a magnet and a reed switch assembly, commonly used in home security systems for monitoring door or window status, e.g., whether a door or window is open or closed.

Although FIG. 1 shows security system 100 comprising only one sensor, it typically comprises multiple sensors, each one monitoring a respective point of entry to a structure, such as a door or window, to determine its status (e.g., "open" or "closed", "locked" or "unlocked", etc.). Alternatively, or in addition, other sensor types could be used in security system 100, such as a non-magnetic door/window sensor, a motion detector, an infrared sensor, a sound detector, a still or video camera, a tilt sensor, and/or other security monitoring devices.

In one embodiment, the sensors communicate with security system controller 104, either wirelessly as shown, or by wired connections. For example, messages may be sent to security system controller 104 from the sensors indicating a status of the monitored points of entry when a change of status is detected by any sensor. Security system controller 104 receives these messages and may take one or more actions in response. For example, if a door is opened, sensor 102 detects a reduction or elimination of a magnetic field produced by an associated magnet as the magnet moves away from sensor 102. In response, sensor 102 transmits a message to security system controller 104 indicative of a status change, e.g., that the door has been opened. In response, security system controller 104 may cause an audible siren to sound and/or notify a central monitoring center 120 that a change in state of one of the sensors and/or points of entry has occurred.

In some embodiments, security system controller 104 may send messages to sensor 102 requesting a status of the sensor and, implicitly, the status of a point of entry being monitored, in this case, the door. In response, sensor 102 transmits a response to security system controller 104 indicating a door status, such as "open", "closed", "locked", or "unlocked". Other commands may be transmitted by security system controller 104, such as "sound alarm", "turn on lights", open gate, lock doors, etc. In response, sensor 102 would cause a device, such as a loudspeaker, lights, motors, etc. to perform the command.

As described above, security system controller 104 performs monitoring of sensors in system 100 and may provide this status information to an electronic display located on security system controller 104. The display provides a visual indication of the status ("open", "closed", "on", "off", "normal", "armed", "alarm", "locked", "unlocked", etc.) of one or more sensors in the system as well as an identification and/or location of the sensors, or only sensors that indicate an "open" status.

In many systems, security system controller 104 may send and receive information to/from a remote keypad/display unit 124, used as a convenient interface for individuals to access security system controller 104. This may be desirable due to security system controller 104 typically being installed in a discreet location, such as a closet or other remote location. Security system controller 104 may send general status information of the security system to keypad/display unit 124, such as "armed", "disarmed", "armed-home", and/or a status of one or more doors, windows, or other items being monitored. Such status may include an identification of one or more doors or windows, their location, and whether they are open, closed, locked, and/or unlocked, etc.

Security system controller 104 may also be in communication with remote monitoring center 120 via wide-area network 122, such as the Internet, PSTN, a fiber optic communication network, wireless communication network (e.g., cellular, data, satellite, etc.), and/or other wide-area network. Remote monitoring center 120 typically provides "live" security monitoring services for homes and businesses equipped with security systems such as the one shown in FIG. 1. Remote monitoring center 120 is adapted to receive communications from security system controller 104 via wide-area network 122 in response to security system controller 104 determining that a local alarm condition (e.g., door or window opened, movement detected, infrared detected, light beam interrupted, light turned on or off, etc.) has been detected by one or more sensors in security system 100. In other embodiments, security system controller 104 simply receives raw data from the sensors and determines, based on the data, whether a local alarm condition has occurred. When a local alarm condition is detected, security system controller 104 generates a system alarm which may comprise taking one or more actions, such as notifying remote monitoring center 120 that a local alarm condition has occurred, illuminating one or more lights, sounding one or more audible alerts, transmitting one or more commands to various sensors to perform an action, such as sound an alarm, turn on a light, lock a door or window, etc.

In addition to security system 100, a home entertainment center may be located within structure 101, in one embodiment comprising set-top box 128, television 130, remote control 132, and amplifier/receiver 134. In one embodiment, auxiliary interface device 144 is a stand-alone, electronic device used as an interface between remote control 132 and other devices and/or systems, such as security system 100, lights, garage door openers, appliances, electronic locks, etc. Set-top box 128, television 130, amplifier/receiver 134, and auxiliary interface device 144 may be collectively referred to herein as the "Devices". In other embodiments, television 130 comprises all of the necessary circuitry to receive entertainment programming directly from one or more sources, such as an over-the-air signal broadcast from a television station or distribution tower, from a wide-area network such as the Internet, from a satellite dish, and/or from a terrestrial source, such as from a cable television network.

Remote control 132 traditionally broadcasts infra-red signals for reception by television 130, set-top box 128 and/or amplifier/receiver 134 for controlling operation of television 130 and/or set-top box to, for example, change television channels, adjust volume levels, record programs, play back pre-recorded programs, and/or control other home entertainment equipment, such as a home stereo system and even lights or appliances. Amplifier/receiver may provide amplification of radio signals for listening over loudspeakers, but may also provide switching capabilities for switching a number of different input signals to an output port, which connects to television 130. In this way, any of the inputs can be switched to the output port for display on television 130, rather than providing the inputs directly to television 130.

In one embodiment, remote control 132 is capable of controlling security system 100, even though security system 100 typically is not capable of receiving the type of signals provided by remote control 132, either because of the type of signal emitted by remote control 132 (e.g., IR, RF, etc.) or the signal protocol used by remote control 132 to control operation of television 130 and/or set-top box 128.

Network-Based Control

In this embodiment, remote control 132 interacts with security system 100 via one of the Devices, wide-area network 122 and security server 138. Remote control 132 provides native signals to one or more of the Devices, for example sends commands in the form of infra-red signals to auxiliary interface device 144, then one of the Devices converts the infra-red signals into electronic signals, and formats the signals from transmission to security server 138, typically via wide-area network 122. Server 138, in turn, provides the commands to security system controller 104 via wide-area network 122. Security system controller 104 evaluates the commands and performs one or more actions based on the type of command received, such as to arm or arm security system 100 or to provide status information of security system 100 and/or its various sensors. In another embodiment, security system controller 104 provides updated status reports to server 138, for example, upon a change detected in one of the sensors, at predetermined time intervals, or on a continuous basis. In this embodiment, server 138 may refrain from contacting security system controller 104 when a command is received from one of the Devices within structure 101 if a status has been received from security system controller 104 within a predetermined time period of receipt of the command, such as 1 minute.

Remote control 132 and/or any of the Devices may automatically determine how to communicate with security system controller 104, i.e., determining a command set and/or communication protocols of various types of security systems. Such auto-determinations are described in, for example, U.S. Pat. No. 9,257,037 entitled, "System and Method for Automatically Setting Up a Universal Remote Control", U.S. Pat. No. 9,326,021 entitled, "System and Method for Reconfiguration of an Entertainment System Controlling Device", U.S. Pat. No. 9,208,679 entitled, "System and Method for Configuring the Remote Control Functionality of a Portable Device", and U.S. patent application Ser. No. 14/277,968 entitled, "System and Method for appliance detection and app configuration", each assigned to the assignee of the present application and incorporated by reference herein in their entireties.

When a command is received by security system controller 104, security system controller 104 interprets the command and performs one or more predetermined actions based on information stored in a memory within security system controller 104. For example, the command may instruct security system controller 104 to arm or disarm security system 100 or to arm or disarm one or more of the sensors monitored by central security controller 104. The command could alternatively comprise a request to provide status information of system 100 as a whole and/or status of one or more of the monitored sensors. In response to performing the one or more commands, security system controller 104 may provide an acknowledgement that the one or more actions have been performed by sending an acknowledgement message to server 138. Server 138, in turn, may provide the acknowledgement back to the Device that sent the command.

Back at structure 101, the Device that sent the command or status request may receive the acknowledgement message and/or status information from server 138 via wide-area network 122. In response, the device may perform one or more actions, such as illuminate one or more visual indicators located on the device, and/or it may send a signal to television 130 for display on television 130. For example, the device may provide a signal directly to television 130, or it may, alternatively, provide the signal to another Device, such as integrated amplifier/receiver 134 that is capable of receiving multiple sources of audio/video (for example, a television signal from a cable TV set-top box, a DVD signal from a DVD player, a game signal from a game console, etc.) and selecting one of the sources for display on television 130. One of the sources may comprise the Device that communicates with server 138, and when the Device sends the status information received from server 138 or the acknowledgment that one or more actions have been performed, amplifier/receiver 134 provides the status information or acknowledgment to television 130 for visual and/or audible presentation by television 130 to the user. In another embodiment, the status information or acknowledgment is superimposed with a second signal by the amplifier/receiver 134 or television 130, for example a television signal provided by cable set-top box 128, and the status information or acknowledgement may be superimposed with the television signal, e.g., the status information/acknowledgment may be shown as a "picture within a picture" format on television 130.

Figure 2:
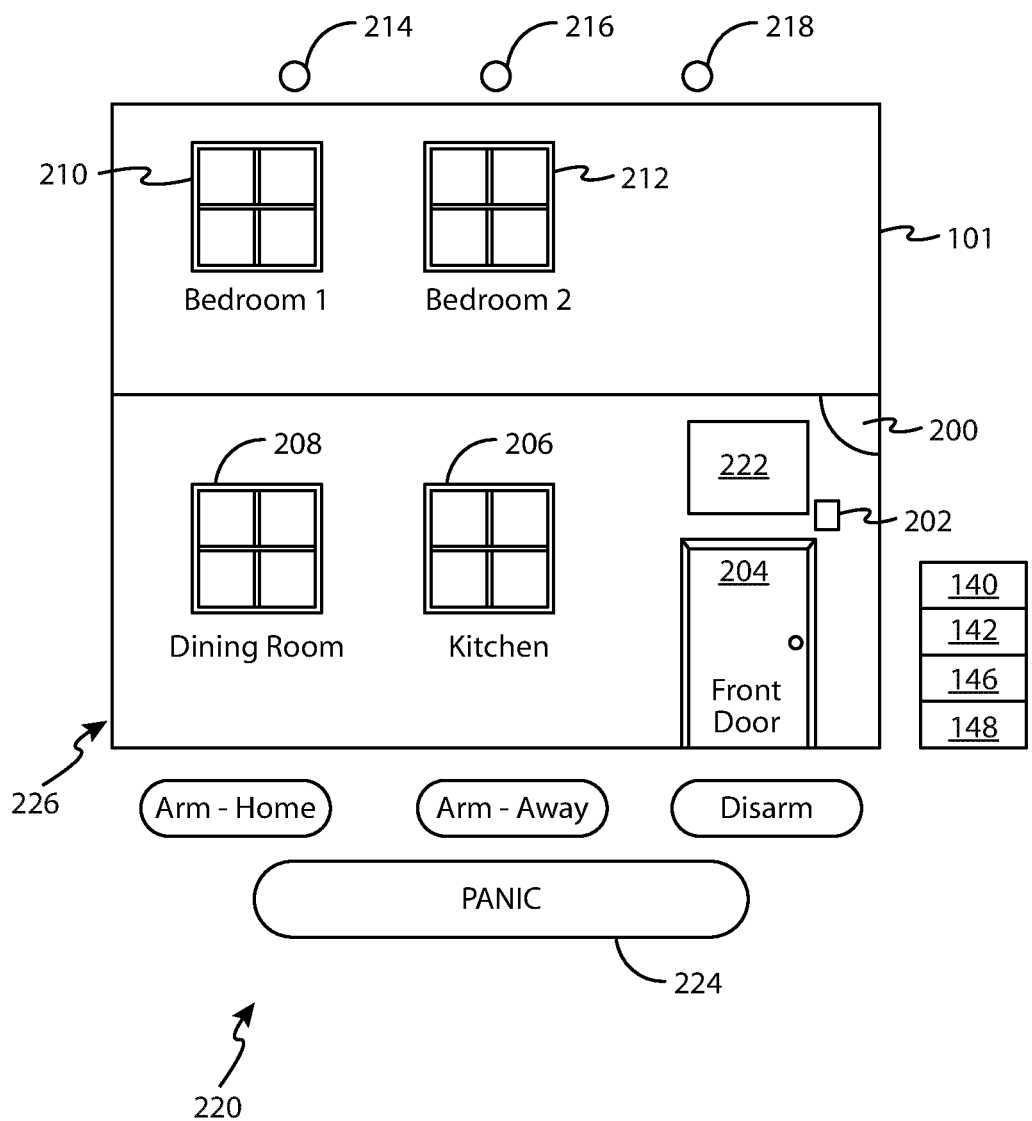
FIG. 2 illustrates a security dashboard, comprising a graphical representation of the structure shown in FIG. 1 and a motion sensor, a door sensor, a door and windows.

When a user of remote control 132 transmits a signal indicating a desire to view security status information or to issue a command, in one embodiment, a "security dashboard" 216, as shown in FIG. 2, may be displayed on television 130 in response to receipt of the signal by one or more of the Devices. The security dashboard is a graphical representation of security system 100 that allows users of remote control 132 to quickly determine the status of security system 100 and/or to know whether commands have been executed based on what is displayed by security dashboard 220 on television 130. The security dashboard may be presented automatically whenever a security status request or command is received by one or more of the Devices, or it may be presented simply by a request from remote control 132, e.g., by pressing a pre-designated key. In this case, remote control 132 generates a "dashboard display signal" for transmission in the remote control's native communication type and/or protocol, to one or more of the Devices. At least one of the Devices receives this signal and evaluates it to determine that it is a dashboard display signal. In response, security dashboard 220 is presented on television 130 by being switched to an input of television 130, for example by amplifier/receiver 134. In one embodiment, the dashboard display signal is received by a first Device, such as amplifier/receiver 134, whereupon the first Device causes an input to the first Device to switch a signal representative of security dashboard 220 from a second Device, such as auxiliary interface device 144, to an output of the first Device. The first Device is capable of receiving multiple signals each from a particular source and selecting one of the sources for display on television 130. Security dashboard comprises a visual representation, such as a simple line drawing, of structure 101, including sensors, electronic locks, lights, a garage door, or appliances that may be controlled by remote control 132. Dashboard 220 is alterable to reflect a current status of the sensors or other devices/systems related to structure 101. For example, the sensors may be shown in green to indicate that a door or window is closed and red when opened. Security dashboard may be stored in a memory within one of the Devices or even server 138 as HTML code, (i.e., a web page), where a status of system 100 and/or each sensor may be visually communicated to the user upon presentation of security dashboard 220 on television 130. In the example where security dashboard is stored and provided by server 138, upon receiving the dashboard display signal, the amplifier/receiver 134 switches an Internet-based connection to television 130, where security dashboard 220 from server 138 is switched to an input of television 130.

FIG. 2 illustrates security dashboard 220, comprising a representation of structure 101 and motion sensor 200, door sensor 202, door 204, and windows 206, 208, 210, and 212. The number and type of sensors used in this example is for illustrative purposes only, whereas other examples may use a greater or a fewer number of sensors, and/or different sensor types. In FIG. 2, only two sensors are shown as graphical representations or icons, each icon corresponding to a particular sensor located within or outside of structure 101. In another embodiment, representations of the sensors themselves are not shown. Rather, other icons, representing the doors and windows of structure 101 themselves, are illustrated using different visual effects in order to indicate a status of such doors and windows. For example, each door or window icon in dashboard 220 could be rendered in certain colors depending on their status, such as red to indicate "open" or "fault" or "not-monitored" and green to indicate "closed", "operating normally" (referring to a monitoring sensor) or "monitored and closed". Of course, other visual effects may be used, such as the use of two window icons and/or two door icons, one of each respective set of icons illustrating an open window or door, and the other icon illustrating a closed window or door. The icons may be displayed in security dashboard 220 in a manner that indicates their relative placement throughout structure 101, as shown. Indicators 214, 216, and 218 may provide status information of system 100 as a while, for example, "armed-home", "armed-away" and "disarmed", respectively.

FIG. 2 also illustrates an indication or icon 222 representing a still or video camera 140 located inside or outside of structure 101. In one embodiment, one or more still images or a video stream may be displayed within icon 222, providing a user watching television 130 with real-time information as to the status of various areas of structure 101. Signals from such video or still cameras 140 are typically provided to a gateway or router/modem combination 150 or to central security controller 104, where they may be then provided to server 138 for distribution to television 130 as described above. In one embodiment, a user may select one of the still images and/or video streams using remote control 132, by pressing one or more pushbuttons, selecting one or more icons displayed on remote control 132, by gesturing with remote control 132, or some other way to select one of the digital images and/or video streams. A signal is broadcast from remote control 132 indicative of the user's selection, and the selection is routed by one of the Devices back to server 138, where server 138 causes the selected image/video stream become enlarged, thus encompassing more of the digital template or even encompassing the entire digital template, such that the selected image/video stream is "blown up" on television 130 for detailed viewing by the user.

In another embodiment, where one or more of the digital cameras are capable of panning, tilting and/or zooming, remote control 132 may be used to provide commands to such cameras. In this embodiment, a user of remote control 132 may enter such commands via the methods described above, and remote control 132 then broadcasts one or more signals indicative of the command(s). The one or more signals are received by one or more of the Devices, and then provided to server 138. Server 138, in response, converts the one or more signals into commands interpretable by the cameras, and provides the commands to the cameras via wide-area network 122.

In another embodiment, remote control 132 may be used to display all available images/video streams simultaneously on television 130, maximizing the viewable area of each image/stream based on the number of images/video streams available. A user may instruct server 138 to display such images/streams by entering a predetermined command into remote control 132, as described above. In response, one more of the Devices receives this command and forwards it to server 138. Server 138, in response, causes all of the images/streams to occupy most or the entire security dashboard 220. For example, if 4 video cameras have been installed into various locations of structure 101, server 138 may arrange each of the four video streams from the four cameras into four, equal-sized viewing areas, with two viewing areas side-by-side and the other two viewing areas on top of the other two. Of course, a variety of other arrangements are possible, such as arranging the viewing areas side-by-side, by causing one of the viewing areas to occupy a large portion of security dashboard 220, while other images/streams are shown as smaller views waiting to be "rotated" into the main viewing area, or some other viewing arrangement. In one embodiment, server 138 provides the images/streams to television 130 via the amplifier/receiver 134. After the images/streams have been presented to the user via television 130, the user may select one of the images/streams for better viewing, similar to the technique described above.

In yet another embodiment, a television program may be interrupted when a person is detected outside of structure 101. In this embodiment, camera 140 could be positioned to view an exterior portion of structure 101, for example within proximity of a front door of structure 101 or a window. Such a camera can be used to provide still or video images to television 130 upon detection of a person in proximity to an area of a door or window to be monitored. In one embodiment, camera 140 is used in conjunction with human sensing device 142, such as a motion sensor, switch-activated welcome mat, line-of-sight interruption system (such as a beam-interruption detector), ultrasonic transducer, a doorbell, or some other device capable of detecting when a person is outside a door or window of structure 101. Camera 140 is coupled to television 130 via wired or wireless means, for example via a wired and/or wireless local-area network provided by modem/router/gateway 150. Signals from camera 140 may be provided to an auxiliary interface device 144, or directly to amplifier/receiver 134 or television 130, if such devices comprise circuitry, such as a Wi-Fi receiver. In the case of auxiliary interface device 144, it provides the images/video from camera 140 to amplifier/receiver 134 and/or television 130. In any case, any of these Devices may receive a signal from human sensing device 142 which causes television 130 to interrupt a currently-viewed program in order to display the image/video provided from camera 140 when a person is detected within range of camera 140. In another embodiment, only a portion of a currently-viewed program is interrupted, i.e., television 130 provides the image/video from camera 140 as a "picture-in-a-picture" format, so that both the currently-viewed program and the image/video are seen simultaneously on television 130.

In one embodiment, a user of television 130 may engage in verbal communication with the detected person, using either remote control 132, auxiliary interface device 144, television 130 or a combination of these, to transmit a signal to an amplifier/speaker device 146 located proximate to camera 140 or the location being monitored by camera 140. In any case, a user of television 130 may enter a predetermined sequence into remote control 132, indicative of the user's desire to communicate with the detected person. In response, remote control 132 transmits a signal to one or more of the Devices, instructing at least one of the Devices to begin transmitting a signal representative of the user's voice to amplifier/speaker device 146. In another embodiment, the user's voice is transmitted without having to enter a particular sequence into remote control 132, i.e., the user's voice may be transmitted by remote control 132 or one of the Devices as soon as an image/video is presented to the user on television 130. In one embodiment, when an audio signal is detected by television 130, i.e., a signal from auxiliary interface unit 144 contains a voice signal from a person outside of structure 101, television 130 may mute the audio signal of the television programming so that the user can hear the person outside of structure 101.

In any case, when the user begins speaking, the user's voice is converted into an electronic signal representative of the user's voice by remote control 132 or by any one of the Devices or auxiliary interface device 144. The electronic signal is then transmitted to amplifier/speaker device 146 for presentation to the detected person. In one embodiment, where multiple cameras 140 and multiple amplifier/speaker devices 146 are used, the user's voce signal is transmitted only to the amplifier/speaker device associated with the particular human sensing device 142 that alerted the Devices to the presence of the person. This is accomplished by the Devices receiving an identification code from human sensing device 142 upon detection of a person. In one embodiment, a microphone 148 incorporated into human sensing device 142 or camera 140, or a stand-along microphone, may provide the person's voice via the local-area network to one or more of the Devices, whereupon the person's voice may be broadcast from speakers coupled to amplifier/receiver 134 and/or via speakers that are part of television 130. In this way, a two-way conversation may take place between the user and the person.

In a related embodiment, a panic icon 224 may be displayed on security dashboard 220 for selection by a user of remote control 132, typically be using hard or soft arrow keys on a user interface of remote control 132 or by pressing a pre-designated button or switch on remote control 132. In another embodiment, a dedicated key, button, or sequence of keystrokes and/or gestures entered by the user to remote control 132 causes remote control 132 to transmit a panic signal to one of the Devices. In one embodiment, when the panic signal is received by one of the Devices, or when the panic icon is selected by a user via remote control 132, one of the Devices that received the signal alerts remote monitoring center 120 of a panic condition by transmitting a signal via one of a number of alternative ways, such as transmitting a signal to security system controller 104, via wide-area network 122, or via a cellular or POTS module installed into any one of the Devices to contact remote monitoring center 120 via a cellular or telephone network, respectively. In the example of transmitting a signal to security system controller 104, one of the Devices may be registered with security system controller 104 as a "sensor", so that when a signal is received from one of the Devices, security system controller 104 treats the signal the same as if a door or window sensor alert signal had been received. Accordingly, security system controller 104 may take one or more actions, such as contacting remote monitoring center 120, causing a siren to sound or lights to flash within or outside structure 101.

Local Control

In another embodiment, server 138 is not used to provide status information of security system 100 to television 130 or to forward commands from one of the Devices to security system controller 104 in order to control operation of security system 100. Rather, such status requests, status information, commands and acknowledgements are communicated directly between one or more of the Devices and central security controller 104 in response to signals from remote control 132. In this embodiment, auxiliary interface device 144 comprises circuitry and software to allow such status requests and commands to be routed from remote control 132 to central security controller 104 and from central security controller 104 to device 126 and on to television 130. In other embodiments, the functionality of auxiliary interface device 144 is incorporated into television 130, set-top box 128, amplifier/receiver 134, or remote control 132.

Auxiliary interface device 144 may be capable of receiving signals from remote control 132, as described above with respect to requesting security system status information, providing security dashboard 220 to television 130 or an intermediary Device, interacting with security dashboard 220, and communicating with persons outside of structure 101. It further is capable of communicating directly with central security controller 104, with or without the local-area network provided by modem/router/gateway 150, in order to transmit commands and to receive status information, and may be capable of receiving signals from camera 140/human sensing device 140/amplifier/speaker device 146, and/or microphone 148 typically via the local-area network. Finally, auxiliary interface device 144 may be capable of providing signals to television 130, typically via a switchable device such as amplifier/receiver 134, for providing security dashboard 220, status information related to security system 100, image/video information from camera 140, and audio information from microphone 148.

Smart Remote Control 132

In one embodiment, remote control 132 may be capable of learning one or more users' television viewing habits, and in response, automatically controlling one or more aspects of security system 100 and/or other devices or systems. For example, remote control 132 may determine that television 130 is turned on between 6 and 7 pm Sunday through Thursday and turned off at approximately 10 pm on those days. This may indicate that a user is finished watching television for the evening, and will soon retire for the evening. This embodiment may require that remote control 132 be programmed with a current time and/or date, which may be accomplished via user interface 304 or remotely using a smart phone, tablet computer or computer coupled to remote control 132. When remote control 132 determines that a user has turned television 130 off via remote control 132 around, for example, 10 pm, remote control 132 may perform one or more actions. For example, remote control 132 may transmit a signal that causes security system 100 to enter an "armed-home" mode of operation, where an alarm is generated when a door or window is opened, but not generated when motion is detected inside structure 101 by one or more motion sensors. Remote control 132 may, in addition, determine whether a garage door is open and, if so, transmit a signal to have the garage door closed. Additional actions may include turning off or on one or more lights inside and/or outside structure 101, turning off one or more of the Devices, locking electronic door or window locks, controlling a thermostat, controlling appliances, etc. In one embodiment, when remote control 132 determines that television 130 had been turned off via remote control 132 before the approximate time that the user retires for the evening, remote control 132 may query the user, either directly by remote control 132 or by transmitting a signal for display to the user before television 130 is turned off, asking the user whether he or she would like to perform the automatic actions normally taken when the user retires for the evening. Multiple queries may be presented, asking the user whether the user desires to interact with other systems or devices, such as whether the user wants to close an open garage door, whether the user wants to turn lights on or off, etc. The user may respond to the query(s) by manipulating remote control 132 to answer the query(s) in the affirmative or the negative. In the former, remote control 132 performs the automated actions normally taken when the user retires for the evening. In the latter, remote control 132 takes no action.

Functional Block Diagrams

Figure 3:
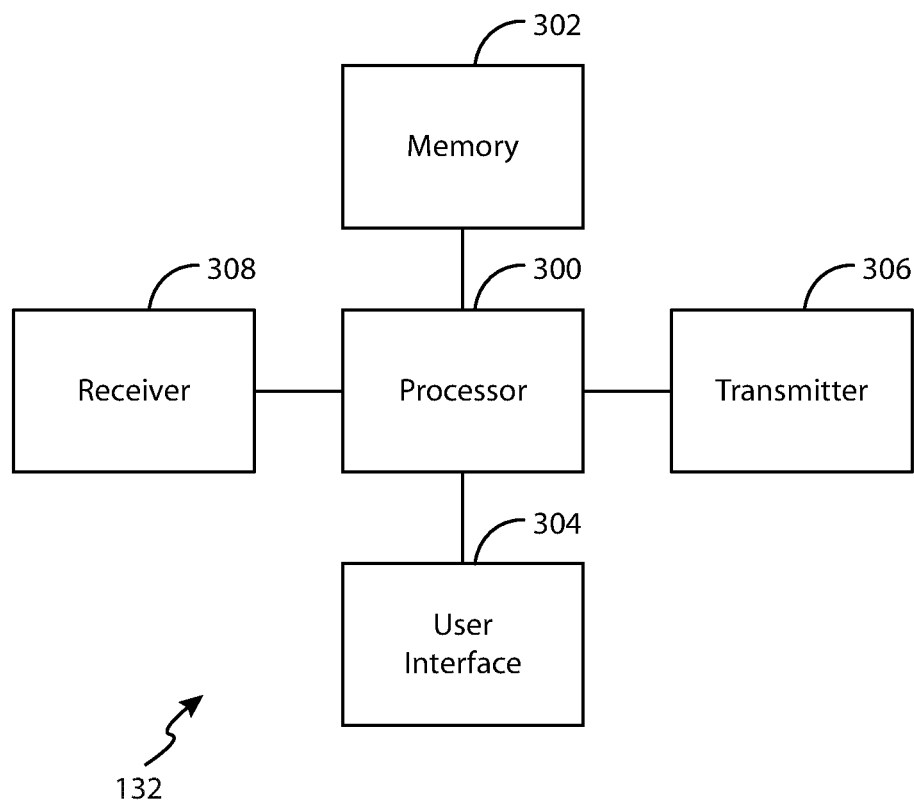
FIG. 3 is a functional block diagram of one embodiment of a remote control used to interact with the security system shown in FIG. 1.

FIG. 3 is a functional block diagram of one embodiment of remote control 132. In this embodiment, remote control 132 comprises hardware/software/firmware needed to support the functionality of remote control 132 as a remote controller for a number of devices. Specifically, FIG. 3 shows processor 300, memory 302, user interface 304, transmitter 306, and optional receiver 308. It should be understood that the functional blocks shown in FIG. 3 may be connected to one another in a variety of ways, and that not all functional blocks necessary for operation of remote control 132 are shown (such as a power supply), for purposes of clarity.

Processor 300 is configured to provide general operation of remote control 132 by executing processor-executable instructions stored in memory 302, for example, executable code. Processor 300 typically comprises a general purpose microprocessor, microcomputer, and/or microcontroller, suitable in size, cost and processing power to perform the functions required of remote control 132.

Memory 302 comprises one or more information storage devices, such as RAM, ROM, EEPROM, UVPROM, flash memory, CD, DVD, Memory Stick, SD memory, XD memory, thumb drive, or virtually any other type of electronic, optical, or mechanical memory device. Memory 302 is used to store the processor-executable instructions for operation of remote control 132 as well as any information used by processor 300 to interact with the Devices and/or security central controller 104, such as information relating to different protocols and frequencies transmitted by remote control 132, commands, an "estimated retirement time" related a time that a user typically stops watching television 130 and retires for the evening, codes used to interact with other devices, date and time information, etc.

User interface 304 is coupled to processor 300 and allows a user to receive information from remote control 132 and control operation of one or more Devices, security system 100, and other devices, such as lights, electronic locks, garage doors, thermostats, etc. User interface 304 may comprise one or more pushbuttons, touchscreen devices, biometric readers, switches, sensors, keypads, and/or microphones that generate electronic signals for use by processor 300 upon initiation by a user. User interface 304 may additionally comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of information to a user.

Transmitter 306 comprises circuitry necessary to transmit signals from remote control 132 to other devices within structure 101, including status requests and commands to control operation of one or more devices and systems, including security system 100, garage doors, electronic locks, appliances, lights, thermostats, etc. Such circuitry is well known in the art and may comprise BlueTooth, Wi-Fi, RF, IR, Zigbee, Z-wave, or some other mesh network protocol, optical, or ultrasonic circuitry, among others.

Receiver 308 comprises one or more receivers capable of receiving signals transmitted by remote control 132, for example an IR receiver, RF receiver, ultrasonic receiver, etc. Receiver 308 receives native signals from remote control 132 and converts them into electronic signals for processor 300 to evaluate. Such receivers are well-known in the art.

Figure 4:
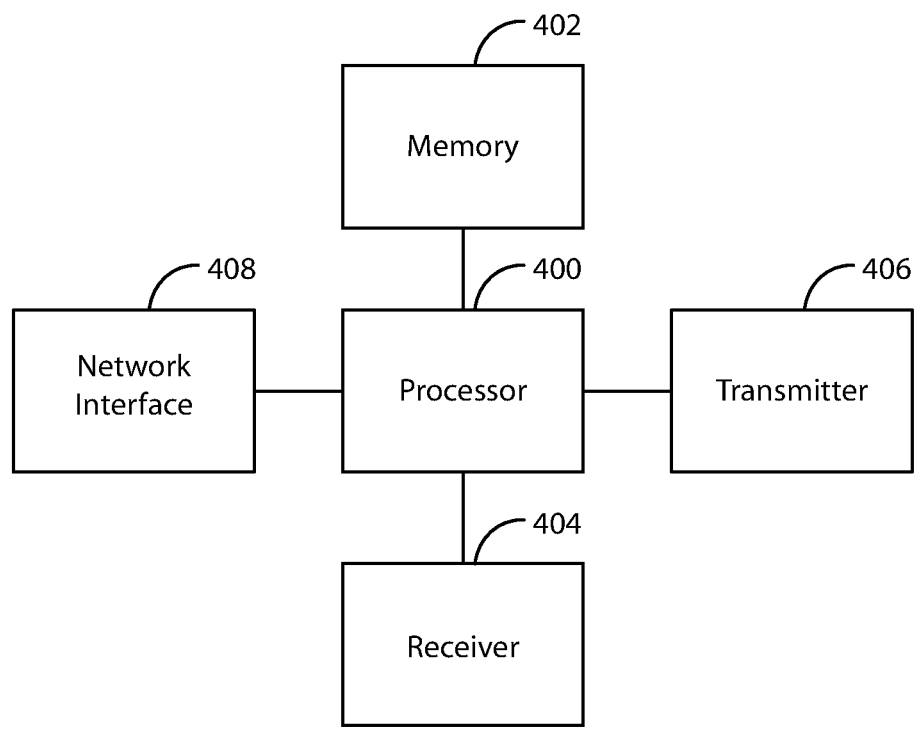
FIG. 4 is a functional block diagram of one embodiment of a device that receives signals from the remote control shown in FIG. 3 and sends signals to the security system controller.

FIG. 4 is a functional block diagram of one embodiment of any of the Devices, but discussed in terms of auxiliary interface device 144. In this embodiment, auxiliary interface device 144 comprises hardware/software/firmware needed to support the functionality of auxiliary interface device 144 as in interface among remote control 132, security system 100, and television 130. In other embodiments, auxiliary interface device 144 is also configured to interface with a number of other devices, such as lights, electronic locks, garage doors, entertainment equipment, thermostats, and/or appliances. Specifically, FIG. 4 shows processor 400, memory 402, receiver 404, transmitter 406, and optional network interface 408. It should be understood that the functional blocks shown in FIG. 4 may be connected to one another in a variety of ways, and that not all functional blocks necessary for operation of auxiliary interface device 144 are shown (such as a power supply), for purposes of clarity.

Processor 400 is configured to provide general operation of auxiliary interface device 144 by executing processor-executable instructions stored in memory 402, for example, executable code. Processor 400 typically comprises a general purpose microprocessor, microcomputer, and/or microcontroller, suitable in size, cost and processing power to perform the functions of auxiliary interface device 144.

Memory 402 comprises one or more information storage devices, such as RAM, ROM, EEPROM, UVPROM, flash memory, CD, DVD, Memory Stick, SD memory, XD memory, thumb drive, or virtually any other type of electronic, optical, or mechanical memory device. Memory 402 is used to store the processor-executable instructions for operation of auxiliary interface device 144 as well as any information used by processor 400 during operation of auxiliary interface device 144, such as information relating to different signals transmitted and received by auxiliary interface device 144, codes used to interact with other devices, etc.

Receiver 404 comprises circuitry necessary to wirelessly receive signals from remote control 132. Such circuitry is well known in the art and may comprise BlueTooth, Wi-Fi, RF, IR, Zigbee, Z-wave or some other mesh network circuitry, optical, and/or ultrasonic, among others.

Transmitter 406 is used to transmit signals to one or more devices, such as security system controller 104, any of the Devices, to one or more home automation system, lights, entertainment equipment, electronic locks, garage doors, etc. Such circuitry is well known in the art and may comprise BlueTooth, Wi-Fi, RF, Zigbee, Z-wave, or some other mesh network circuitry, optical, or ultrasonic circuitry, among others.

Network interface 408 may be used to transmit and receive signals to a local-area network, such as commands, requests, status information, control signals, etc. Network interface 408 comprises well-known circuitry such as Ethernet circuitry to communicate using packet-based protocols with one or more external devices, such as modem/router/gateway 150. Using network interface 408, auxiliary interface device 144 may communicate with any number of the Devices and/or other devices or systems via modem/router/gateway 150.

Figure 5:
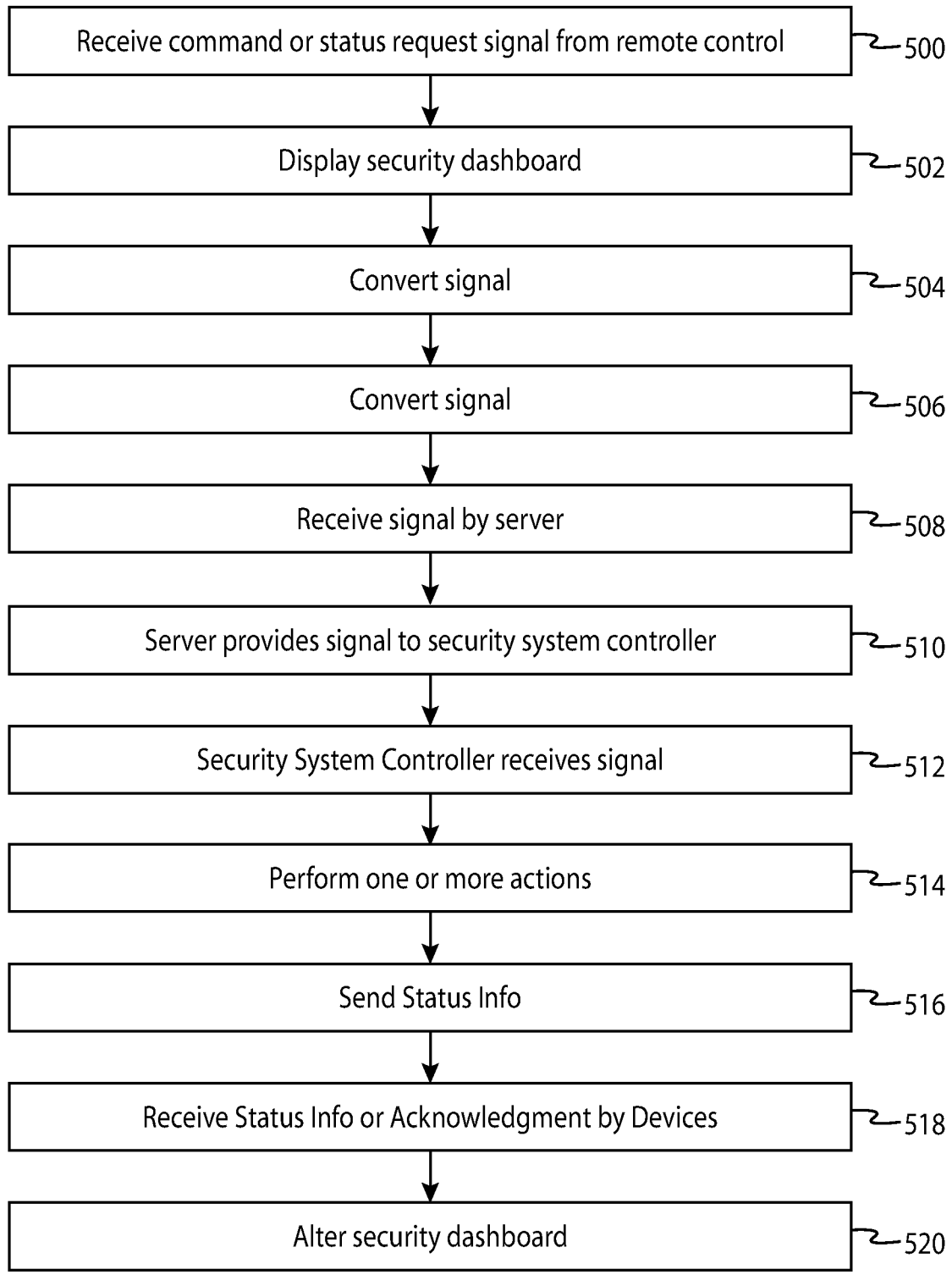
FIG. 5 is a flow diagram illustrating one embodiment of a method for using the remote control of FIG. 3 to interact with the security system of FIG. 1.

FIG. 5 is a flow diagram illustrating one embodiment of a method for interacting with a security system using a television remote control for controlling operation of the security system and for receiving status information related to the security system. The method is performed by one or more of the Devices and/or remote control 132. In one embodiment, one or more of the Devices provides a security dashboard for display on television 130. A signal representing the security dashboard may be provided from one or more of the Devices to another of the Devices in order to switch the security dashboard for display on television 130. In another embodiment, the signal may be provided directly to television 130 to one of its inputs, then switched to display of television 130 upon detection by television 130 of a command or status request. It should be understood that in some embodiments, not all of the steps shown in FIG. 5 are performed. It should also be understood that the order in which the steps are carried out may be different in other embodiments.

At block 500, one or more of the Devices receives a signal from remote control 132 indicative of a user's desire to send a command or a status request to security system 100. The signal is typically an infra-red signal commonly transmitted by most television remote controls, but in other embodiments could comprise an RF signal.

At block 502, one or more of the Devices causes security dashboard 220 to be displayed on television 130, typically by switching a signal representing security dashboard 220 to an input of television 130, or television 130 internally switching the dashboard signal to the television 130 display.

At block 504, one or more of the Devices may convert the signal into a format compatible with security system 100.

At block 506, one or more of the Devices converts the formatted signal into a protocol suitable for transmission over-the-air via transmitter 406, or over a wire via network interface 408. For example, the formatted signal may be converted into TCP/IP packets for transmission to a local-area network, where it is then provided to wide-area network 122 for routing to server 138. In another embodiment, the formatted signal is provided directly to security system controller 104 without the use of wide-area network 122, via direct wireless transmission of the digital representation to security system controller 104 or via the local-area network.

In one embodiment, at block 508, server 138 receives the digital representation and evaluates it to determine a destination for the digital representation. In one embodiment, one or more of the Devices logs onto an account maintained by server 138 associated with server 138.

At block 510, server 138 determines which security system to send the digital representation based on identification information that may have been transmitted along with the digital representation, and provides the formatted signal to security system 100, specifically security system controller 104.

At block 512, security system controller 104 receives the digital representation of the status request or the command to perform one or more actions.

At block 514, security system controller 104 may perform one or more actions based on the received formatted signal, such as arming security system 100 or disarming the system, when the digital representation comprises a command. After the one or more actions have been performed, security system controller 104 may provide an acknowledgement that the one or more actions have been successfully completed either to server 138, to local-area network, or directly to the circuitry. If one or more of the actions cannot be completed, for example if a command to arm system 100 was received, but a door or a window is open, system 100 typically cannot be armed. In this case, security system controller 104 may send an indication to server 138/local-area network/circuitry that at least one of the actions were not completed, and may additionally provide a reason for the non-performance, such as "one or more doors/windows open", "low battery" (of a sensor), "heartbeat missing" (of a sensor), "movement detected", etc. In one embodiment, further information of the non-performance is provided, such as an identification of any open doors or windows that prevent system 100 from being armed, an identification of which sensors are experiencing a low battery condition or missing heartbeat, an identification of a room or area where movement was detected, a sensor identification number associated with any of the aforementioned sensors/conditions, etc.

At block 516, security system controller 104 may send an overall status of security system 100 and/or a status of one or more sensors monitored by security system controller 104 either to server 138, to the local-area network, or directly to one or more of the Devices when the digital representation comprises a status inquiry.

At block 518, in one embodiment, the acknowledgement and/or status is received by one or more of the Devices. In another embodiment where server 138 is used and provides the security dashboard, server 138 alters the security dashboard to reflect a current status of security system 100 and/or individual sensors, as well as alters the security dashboard to provide an indication that the one or more actions were successfully performed or not. For example, server 138 or one or more of the Devices may update the appearance of the icons representing the sensors monitored by security system controller 104, e.g., by illuminating an icon in green coloring when a door or window associated with the icon is closed and illuminating an icon in red when a door or window is open. A border 226 of structure 101 may be shown in security dashboard 220 in green to indicate that security system 100 has been armed or red to indicate that it has been disarmed, or a message indicating the status or an indication whether the one or more actions were successfully performed or not.

In one embodiment, the acknowledgement from security central controller 104 comprises information indicating that one or more actions were not successfully performed and an identity of the action or actions that were not performed as well as an identification of a particular door or window that prevented an action from being performed or sensors associated therewith. For example, if a front door is ajar, a sensor monitoring the front door may report that the door is open to security system controller 104. If security system controller 104 received a command to arm security system 100, security system controller 104 would generally not be permitted to arm system 100 due to the front door being open. Security system controller 104 may, in response, send an acknowledgement to server 138 indicating that arming system 100 was not successful, and that the reason is that the front door is open. In response to receiving the acknowledgement, server 138 may alter security dashboard to indicate to the user that a particular action was not successfully performed, and an identification of a door or window, or related sensors, that prevented an action from being performed.

At block 520, in an embodiment where the security dashboard is provided by the one or more Devices rather than server 138, in response to receiving the acknowledgement or status, the one or more Devices may alter security dashboard 220 to reflect a current status and/or acknowledgement, as described above.

The result of the foregoing is that when a user operates remote control 132 to obtain a status of security system 100 or enters a command for security system 100 to perform one or more actions, security dashboard 220 is displayed via television 130 for the user to observe the status of security system 100 and determine whether commands sent to security system 100 were successfully performed or not.

Figure 6:
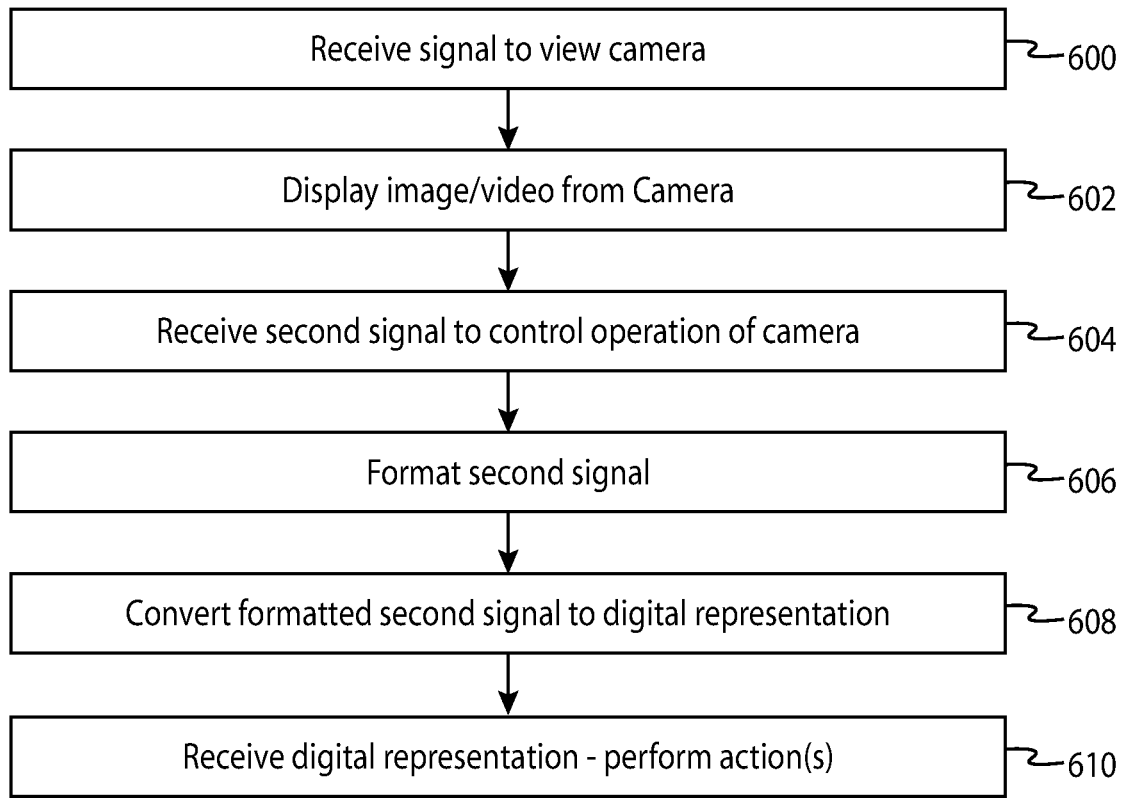
FIG. 6 is a flow diagram illustrating one embodiment of a method for interacting with a camera using the remote control of FIG. 3 and for viewing still or video images provided by the camera.

FIG. 6 is a flow diagram illustrating one embodiment of a method for controlling camera 140 using a television remote control and for viewing still or video images provided by camera 140. The method is performed by one or more of the Devices. It should be understood that in some embodiments, not all of the steps shown in FIG. 6 are performed. It should also be understood that the order in which the steps are carried out may be different in other embodiments.

At block 600, one or more of the Devices receives a signal from remote control 132 indicative of a user's desire to view still or video images from camera 140 and/or to control operation of camera 140. The signal is typically an infra-red signal commonly transmitted by most television remote controls, but in other embodiments could comprise an RF signal.

At block 602, one or more of the Devices causes a feed from camera 140 to be displayed on television 130. This may occur in response to one or more of the Devices switching a signal from camera 140 or from the local-area network to display on television 130. After the feed has been displayed on television 130, a user of remote control 132 is able to view still or video images from camera 140.

At block 604, the circuitry receives a second signal from remote control 132 indicative of a user's desire to control operation of camera 140, in an embodiment where camera 140 is capable of remote control operation. The second signal may indicate that the user desires to pan, tilt, rotate, zoom, or control some other operation or aspect of camera 140.

At block 606, one or more of the Devices converts the second signal into a format compatible with camera 140 in accordance with formatted camera commands stored in memory 402.

At block 608, the circuitry converts the formatted signal into a digital representation suitable for transmission over the air via transmitter 406, or over a wire via network interface 408. For example, the formatted signal may be converted into TCP/IP packets for transmission to a local-area network, where it is then provided to camera 140. In another embodiment, the digital representation is transmitted directly to camera 140 without the use of local-area network 122, via direct wireless transmission of the digital representation.

At block 610, camera 140 receives the digital representation of the second signal and performs operations based on the type of command sent by the user, i.e., to pan, tilt, rotate, zoom, etc.

The result of the foregoing is that still or video images may be presented to a user from a security camera located within or exterior to structure 101 using remote control 132 and television 130 to view the images. The user may further control operation of the camera using remote control 132.

Figure 7:
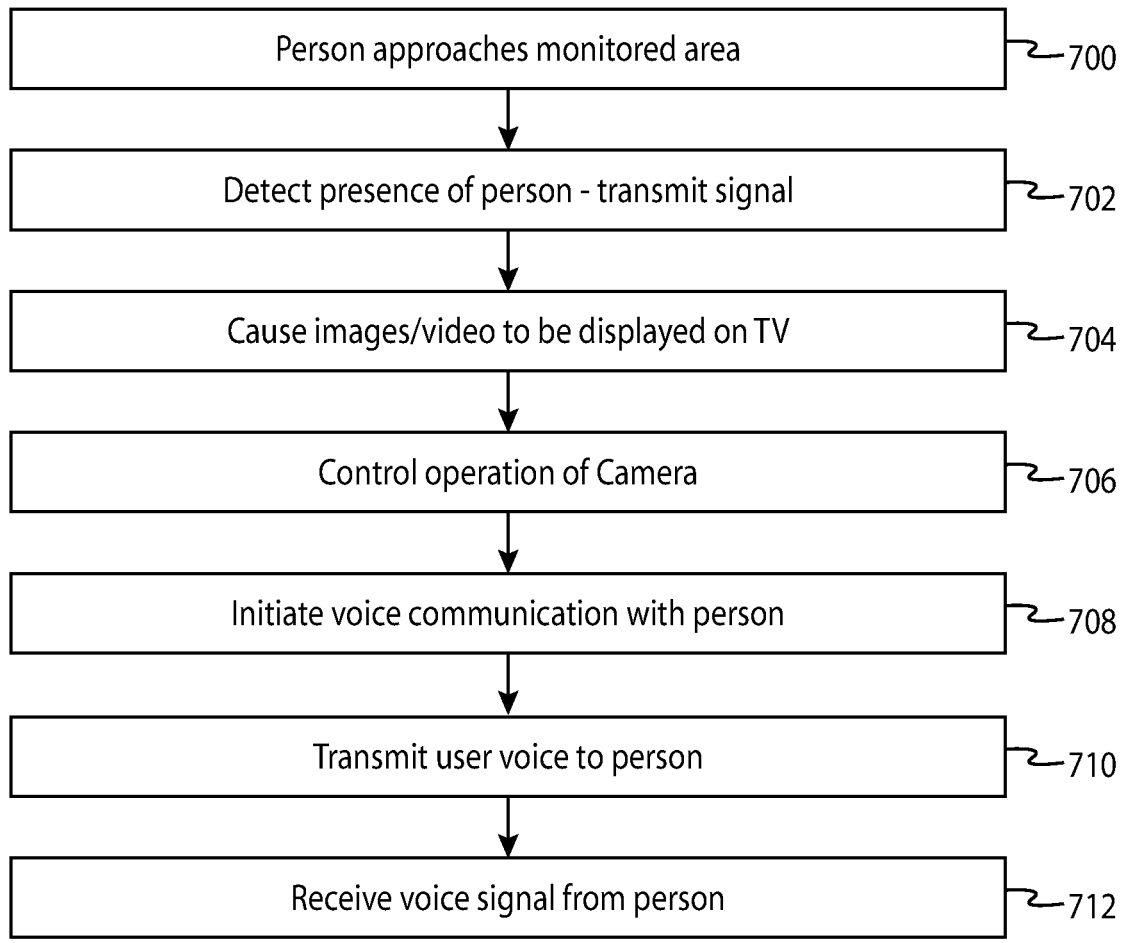
FIG. 7 is a flow diagram illustrating one embodiment of a method for interacting with a person located outside of the structure shown in FIG. 1.

FIG. 7 is a flow diagram illustrating one embodiment of a method for interacting with a person located outside of structure 101. The method is performed by one or more of the Devices in conjunction with a human sensing device 142 positioned proximate to a door or a window to be monitored. It should be understood that in some embodiments, not all of the steps shown in FIG. 7 are performed. It should also be understood that the order in which the steps are carried out may be different in other embodiments.

At block 700, as a user is watching television 130, a person may approach door or a window monitored by camera 140 and human sensing device 142, such as when a salesman approaches a front door of structure 101.

At block 702, human sensing device 142 detects the person and, in response, transmits a signal that is received by one or more of the Devices.

At block 704, in response to receiving the signal from human sensing device 142, one or more of the Devices causes a still or video image to appear on television 130 by switching a signal from camera 140 or from the local-area network to display on television 130. Signals from camera 140 may be provided to one of the Devices either directly or via local-area network. In any case, the signal from human sensing device 142 causes television 130 to interrupt a currently-viewed program in order to display the image/video provided from camera 140 when a person is detected within range of camera 140. In another embodiment, only a portion of a currently-viewed program is interrupted, i.e., television 130 provides the image/video from camera 140 as a "picture-in-a-picture" format, so that both the currently-viewed program and the image/video are seen simultaneously on television 130.

At block 704, the user may control one or more operations of camera 140, as described above with respect to the method of FIG. 6, if the user wishes to observe the person from a different angle or zoom in for a closer view.

At block 706, the user may engage in verbal communication with the detected person, using either remote control 132 or one of the Devices, to transmit a signal to amplifier/speaker device 146 located proximate to camera 140 or the location being monitored by camera 140. In any case, a user of television 130 may enter a predetermined sequence into remote control 132, indicative of the user's desire to communicate with the detected person.

At block 708, in response to receiving the predetermined sequence, remote control 132 transmits a signal to one or more of the Devices, instructing at least one of these devices to begin transmitting a signal representative of the user's voice to amplifier/speaker device 146, either directly or through the local-area network. In another embodiment, the user's voice is transmitted without having to enter a particular sequence into remote control 132, i.e., the user's voice may be transmitted by remote control 132, one of the Devices or auxiliary interface device 144 as soon as an image/video is presented to the user on television 130.

At block 710, when the user begins speaking, the user's voice is converted into an electronic signal representative of the user's voice by remote control 132 or by any one of the Devices or auxiliary interface device 144. The electronic signal is then transmitted to amplifier/speaker device 146 for presentation to the detected person. In one embodiment, where multiple cameras 140 and multiple amplifier/speaker devices 146 are used, the user's voce signal is transmitted only to the amplifier/speaker device associated with the particular human sensing device 142 that alerted the Devices and/or auxiliary interface device 144 to the presence of the person. This is accomplished by the Devices and/or auxiliary interface device 144 receiving an identification code from human sensing device 142 upon detection of a person.

At block 712, microphone 148 incorporated into human sensing device 142 or camera 140, or a stand-along microphone, is used to provide the person's voice to one or more of the Devices and/or auxiliary interface device 144, whereupon the person's voice may be broadcast from speakers coupled to amplifier/receiver 134 and/or via speakers that are part of television 130. In this way, a two-way conversation may take place between the user and the person using television 132.

Figure 8:
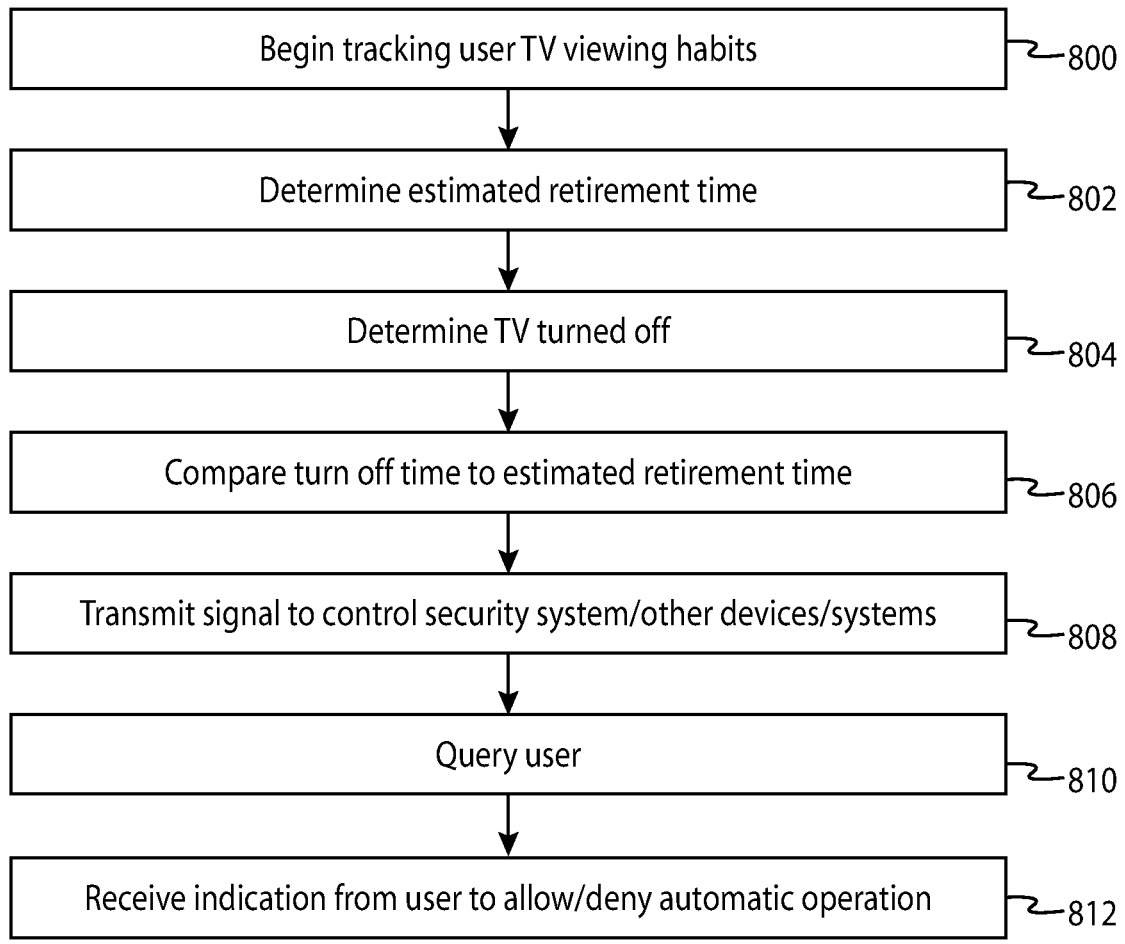
FIG. 8 is a flow diagram illustrating one embodiment of a method for automatically controlling one or more actions of the security system of FIG. 1 as the remote control of FIG. 3 "learns" the habits of one or more users.

FIG. 8 is a flow diagram illustrating one embodiment of a method for automatically controlling one or more actions of security system 100 and/or other systems/devices by remote control 132 as remote control 132 "learns" the habits of one or more users. The method is performed by remote control 132 in conjunction with at least security system 100. Although the method is described with respect to automated operation of security system 100 and/or other systems/devices when a user goes to bed, the method could alternatively be used to automatically control security system 100 and/or other systems/devices when a user wakes up after sleep. It should be understood that in some embodiments, not all of the steps shown in FIG. 8 are performed. It should also be understood that the order in which the steps are carried out may be different in other embodiments.

At block 800, remote control 132 begins to track the viewing habits of one or more users of remote control 132. For example, processor 300 within remote control 132 may store a time when television 130 is turned on and/or off, a channel most frequently watched, volume settings, etc. in memory 302.

At block 802, at some later time, processor 300 evaluates the information accumulated over time and stored in memory 302 to determine an "estimated retirement time" of a user of remote control 130. For example, processor 302 may use previously-stored times when television 130 was turned off and use the average, mean, or median of these times when television 130 was shut off to determine the estimated retirement time. In one embodiment, remote control 132 is not capable of determining a current time and therefore cannot assign a time-of-day when various events are detected by processor 300, such as turn on, turn off, channel selection, volume, etc., as remote control 132 may not be capable of storing time-of-day or date information. In this case, remote control 132 may use a 24 hr. internal clock to store event times on a relative basis. For example, if remote control 132 determines that television 130 was turned off, processor 300 could store that event in memory 302 along with a "zero" relative time. Each time an event occurs, processor 300 may store an indication of the event and the relative time on a rolling 24 hr. cycle. Thus, processor 300 may determine that a "turn on" event does not typically occur within 12 hours of a "turn off" event, indicating that the turn off event was received when a user of remote control 132 decided to turn television 130 off and retire for the evening.

At block 804, after an estimated retirement time has been determined by processor 300, processor determines when a subsequent turn off event occurs, i.e., a "turn off time" when remote control 132 is used to turn off television 130.

At block 806, processor 300 compares the turn off time to the estimated retirement time to determine whether television 130 has been turned off for the evening.

At block 808, when processor 300 determines that the turn off time occurred within a predetermined time window of the estimated retirement time, for example 30 minutes prior to, and any amount of time after, the estimated retirement time, processor 300 automatically causes remote control 132 to transmit a signal to one of the Devices, instructing one of the Devices to send one or more commands to security central controller 104 for security central controller 104 to perform one or more actions, such as arming system 100 in an armed-home mode. In another embodiment, the signal from remote control 132 may cause one or more of the Devices to send signals to other devices and/or systems to control other functionalities, such as to turn on or off lights, close a garage door, lock electronic locks, etc.

At block 810, when processor 300 determines that the turn off time did not occur within the predetermined time window, processor 300 may query the user to determine whether or not to perform the automated functions normally performed when the user is going to retire for the evening. For example, processor 300 may cause a message to be displayed on user interface 304 asking the user if the user wishes to implement the automated functions normally carried out when the user retires for the evening. Processor 300 may receive a response, again via user input 304, indicating that the user wishes to implement the automated functions, or not.

At block 812, when the user wishes to implement the automated functions, processor 300 causes a transmission of the signal transmitted at block 808 via transmitter 306. When the user does not wish to implement the automated functions, processor does not cause the signal to be transmitted.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method performed by an auxiliary interface device for interacting with a security system controller, a television and a television remote control, comprising:
providing, by a processor of the auxiliary interface, a security dashboard to the television for display by the television;
receiving, by the processor via a receiver coupled to the processor, an electronic signal from the television remote control, the electronic signal transmitted in accordance with a first communication protocol that cannot be directly received by the security system controller, the electronic signal comprising a command to cause the security system controller to perform an action;
accessing, by the processor via a network interface coupled to the processor, a server associated with the security system controller via a wide-area network, the server for providing an interface to the security system controller; and
providing, by the processor via the network interface, the electronic signal to the server via the wide-area network;
wherein the server forwards the electronic to the security system controller to perform the action associated with the command.

2. The method of claim 1, wherein accessing the server comprises: logging onto an account associated with the security system by the processor via the network interface; wherein subsequent commands from the television remote control are provided to the security system controller via the wide-area network and the server after the account has been logged onto.

3. The method of claim 1, wherein the action associated with the command comprises arming the security system controller.

4. The method of claim 1, wherein the action associated with the command comprises disarming the security system.

5. The method of claim 1, wherein the action associated with the command comprises providing a status of the security system controller, and the method further comprises: receiving, by the processor via the network interface, a status signal representative of the status of the security system controller from the server; in response to receiving the status signal, generating, by the processor, a representation of the security system controller status; and sending, by the processor via the network interface, the representation to the television for presentation of the status of the security system controller.

6. The method of claim 5, wherein the representation comprises a graphical view of the status of the security system controller.

7. The method of claim 1, further comprising: receiving, by the processor via the network interface, a second signal from the server indicating that the security system controller did not perform the action; in response to receiving the signal, generating, by the processor, a graphical representation indicative of the non-performance; and sending, by the processor via the network interface, the graphical representation to the television for presentation of the non-performance.

8. The method of claim 7, further comprising: receiving, by the processor via the network interface, a reason for the non-performance from the server; altering, by the processor, the graphical representation to provide an indication of the reason.

9. The method of claim 7, wherein the reason comprises an indication that not all doors and/or windows are closed.

10. The method of claim 5, wherein the status signal comprises an indication that a low battery condition has been detected by the security system controller.

11. An auxiliary interface device for interacting with a security system controller, a television and a television remote control, comprising:
a receiver for receiving signals from the television remote control;
a network interface; a memory for storing processor-executable instructions; and
a processor, coupled to the receiver, the network interface, and the memory, for executing the processor-executable instructions that cause the auxiliary interface device to:
provide, by the processor, a security dashboard to the television for display by the television;
receive, by the processor via the receiver, an electronic signal from the television remote control, the electronic signal transmitted in accordance with a first communication protocol that cannot be directly received by the security system controller, the electronic signal comprising a command to cause the security system controller to perform an action;
access, by the processor via the network interface, a server associated with the security system controller via a wide-area network, the server for providing an interface to the security system controller; and
provide, by the processor via the network interface, the electronic signal to the server; wherein the server forwards the electronic signal to the security system controller to perform the action associated with the command.

12. The auxiliary interface device of claim 11, wherein the instructions that cause the apparatus to access the server comprise instructions that cause the auxiliary interface device to: log onto an account associated with the security system by the processor via the network interface; wherein subsequent commands from the television remote control are provided to the security system controller via the wide-area network and the server after the account has been logged onto.

13. The auxiliary interface device of claim 11, wherein the action associated with the command comprises arming the security system controller.

14. The auxiliary interface device of claim 11, wherein the action associated with the command comprises disarming the security system controller.

15. The auxiliary interface device of claim 11, wherein the action associated with the command comprises providing a status of the security system controller, and the processor-executable instructions further comprise instructions that cause the auxiliary interface device to: receive a status signal representative of the status of the security system controller from the server; in response to receiving the status signal, generate a representation of the security system status; and send the representation to the television for presentation of the status of the security system controller.

16. The auxiliary interface device of claim 15, wherein the representation comprises a graphical view of the status of the security system.

17. The auxiliary interface device of claim 11, wherein the processor-executable instructions further comprise instructions that cause the auxiliary interface device to: receive a rejection signal representative of a rejection by the security system controller in response to the security system controller receiving the command; in response to receiving the rejection signal, generate a television-compatible signal representative of the rejection; and send the television-compatible signal to the television for presentation of the rejection to a user of the remote control.

18. The auxiliary interface device of claim 14, wherein the processor-executable instructions further comprise instructions that cause the auxiliary interface device to: receive, by the processor via the network interface, a reason for the rejection from the server; and alter, by the processor, the graphical representation to provide an indication of the reason.

19. The auxiliary interface device of claim 18, wherein the reason comprises an indication that not all doors and/or windows are closed.

20. The auxiliary interface device of claim 17, wherein the rejection comprises an indication that a low battery condition has been detected by the security system.

\* \* \* \* \*